United States Patent
Ito et al.

(10) Patent No.: US 8,238,004 B2
(45) Date of Patent: Aug. 7, 2012

(54) COLOR SIGNAL PROCESSING APPARATUS, COLOR SIGNAL PROCESSING METHOD, COLOR CONVERSION APPARATUS, AND COMPUTER-READABLE MEDIUM FOR MAPPING COLORS OF AN INPUT COLOR SIGNAL TO COLORS OF AN OUTPUT DEVICE COLOR SPACE

(75) Inventors: Akihiro Ito, Kanagawa (JP); Toshihiro Iwafuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 343 days.

(21) Appl. No.: 12/269,102

(22) Filed: Nov. 12, 2008

(65) Prior Publication Data
US 2009/0310153 A1 Dec. 17, 2009

(30) Foreign Application Priority Data
Jun. 16, 2008 (JP) ................................. 2008-156389

(51) Int. Cl.
*G03F 3/08* (2006.01)

(52) U.S. Cl. ....... 358/518; 358/1.9; 358/3.23; 358/3.27; 358/523; 347/6; 382/167

(58) Field of Classification Search .................. 358/1.9, 358/518, 3.23, 3.27, 523; 347/6; 382/167
See application file for complete search history.

(56) References Cited

U.S. PATENT DOCUMENTS

| | | | | |
|---|---|---|---|---|
| 6,275,302 B1 * | 8/2001 | Coleman | .......................... | 358/1.9 |
| 7,019,868 B2 * | 3/2006 | Chang et al. | .................... | 358/2.1 |
| 2004/0004644 A1 * | 1/2004 | Komatsu et al. | ................. | 347/15 |
| 2005/0062992 A1 | 3/2005 | Kishimoto et al. | | |
| 2006/0203268 A1 * | 9/2006 | Okuyama | ...................... | 358/1.9 |

FOREIGN PATENT DOCUMENTS

| | | |
|---|---|---|
| JP | 9-247471 A | 9/1997 |
| JP | 9-261492 A | 10/1997 |
| JP | 2000-25274 A | 1/2000 |
| JP | 2003-125225 A | 4/2003 |
| JP | 2004-9480 A | 1/2004 |
| JP | 2004-147257 A | 5/2004 |
| JP | 2005-63093 A | 3/2005 |
| JP | 2005-236802 A | 9/2005 |
| JP | 2005-311558 A | 11/2005 |
| JP | 2006-352475 A | 12/2006 |
| JP | 2007-43250 A | 2/2007 |

OTHER PUBLICATIONS

Notification of Reasons for Refusal issued on Apr. 28, 2010 in counterpart Japanese Application No. 2008-156389.

* cited by examiner

*Primary Examiner* — King Poon
*Assistant Examiner* — Jamares Q Washington
(74) *Attorney, Agent, or Firm* — Sughrue Mion, PLLC

(57) ABSTRACT

A color signal processing apparatus includes a total amount calculating unit, a limit value calculating unit and a correcting unit. The total amount calculating unit calculates a total amount value of an input color signal in an output device color space which has, as color components, colors of coloring materials used in an output device. The limit value calculating unit calculates a limit value for limiting a total amount of a color signal, in accordance with the calculated total amount value. The correcting unit corrects the input color signal in the output device color space so that the total amount value of the input color signal becomes the calculated limit value or less.

8 Claims, 17 Drawing Sheets

COLOR SIGNAL PROCESSING APPARATUS, COLOR SIGNAL PROCESSING METHOD, COLOR CONVERSION APPARATUS, AND COMPUTER-READABLE MEDIUM FOR MAPPING COLORS OF AN INPUT COLOR SIGNAL TO COLORS OF AN OUTPUT DEVICE COLOR SPACE

CROSS-REFERENCE TO RELATED APPLICATIONS

This application is based on and claims priority under 35 USC 119 from Japanese Patent Application No. 2008-156389 filed Jun. 16, 2008.

BACKGROUND

1. Technical Field

The invention relates to a color signal processing apparatus, a color conversion apparatus, a color signal processing method, a color conversion method, a computer-readable medium and a computer data signal embedded with a program.

2. Related Art

There is a case that, in an output device for outputting a color image or the like using plural coloring materials, a total amount of the coloring materials used may be limited in order to, for example, maintain a necessary image quality or reduce the load on the output device. For example, where coloring materials of C (cyan), M (magenta), Y (yellow), and K (black) are used, each coloring material amount takes a value of 0% to 100%, and the total coloring material amount takes a value of 0% to 400%. For example, where the total coloring material amount of the output device is limited to 300% (total amount limit value), it is necessary to convert a color having a total coloring material amount larger than 300%, into another color having a total coloring material amount equal to or less than the total amount limit value.

For example, JP Hei.9-247471 A describes that, if a table value of a color conversion table does not satisfy a condition that the total amount is equal to or less than 250%, the table value is changed to a value that satisfies this condition so that a total amount obtained as a result of a color conversion does not exceed the total amount limit value. Also, JP Hei.9-261492 A describes that, if the total amount of inks used exceeds a total amount limit value, C, M, and Y values are decreased while a K value is fixed so as to enable output within the total amount limit value. JP 2000-25274 A describes allowing use of only colors which satisfy a total amount limit value from the beginning. A coloring material amount limiting function is determined by obtaining calorimetric values of the colors satisfying the total amount limit value, and outputs within the total amount limit value are made using this coloring material amount limiting function. JP 2003-125225 A describes limiting a total coloring material amount to be equal to or less than a total amount limit value by increasing or decreasing respective coloring material amounts uniformly before a tone correction so that density values after the one correction satisfy the total amount limit value. Furthermore, JP 2004-147257 A describes generating a color prediction model that satisfies a total amount limit value by changing output values of color patches, which are used in generating the color prediction model, to values of colors that satisfy the total amount limit value.

FIG. 14 is a schematic chart illustrating an example of a color gamut of an output device to which total amount limitation is imposed. Each of JP Hei.9-247471 A, JP Hei.9-261492 A, JP 2000-25274 A, JP 2003-125225 A and JP 2004-147257 A describe such techniques that if a total amount limit value is exceeded, output is made by changing a color so as to satisfy the total amount limit value or using a color gamut that satisfies the total amount limit value. An example of the color gamut in those cases is shown in FIG. 14, which is a section (L-C plane) of the color gamut take along a certain hue. Methods for determining a contour of a color gamut that satisfies the total amount limit value are described in JP 2005-63093 A (corresponding to US 2005/0062992 A) and JP 2006-352475 A, for example.

A point P in FIG. 14 represents a color on a boundary of limitation based on a total amount limit value. The contour of the color gamut is bent at the point P. For example, when a color is varied from a maximum chroma color T toward the low-lightness side along the contour of the color gamut, the color would pass through points indicated by black circles if there were no total amount limitation. However, because of the total amount limitation, colors on the contour of the color gamut which are indicated by the broke line on the low-lightness side of point P are not reproduced, and the color is varied so as to pass white circles which are located on a contour of the color gamut represented by the solid line. As a result, a step in color occurs at the point P.

FIG. 15 is a detailed chart illustrating an example of a color conversion into the color gamut of the output device to which the total amount limitation is imposed. As described above with reference to FIG. 14, the bending point P exists in the color gamut of the output device to which the total amount limitation is imposed. For example, an influence of this phenomenon appears in a process of converting a color outside the color gamut of the output device into a color in the color gamut. FIG. 15 shows an example in which colors indicated by black circles, which are located outside the color gamut and are spaced at regular intervals, are converted into colors on the color contour of the color gamut, which have minimum color differences. The resulting colors produced from the original colors, which are originally spaced at regular intervals, are dense in tone around the point P and, therefore, are sparse in tone on the low-lightness/low-chroma side. Furthermore, the tendency of color variation is changed at the point P.

FIG. 16 is a chart illustrating another example of a color conversion into the color gamut of the output device to which the total amount limitation is imposed. FIG. 16 shows an example in which a certain input color gamut is changed, in its entirety, to the color gamut (output color gamut) of the output device. In this color conversion, colors on the contour of the input color gamut are converted into colors on the contour of the output color gamut, and colors which are located on each conversion direction are converted at the same conversion ratio. As a result, colors (black circles) on the contour of the input color rage are converted into colors (white circles) on the contour of the output color rage, and the tendency of color variation is changed at the point P. At the same time, colors (black triangles) inside the contour of the input color gamut that are arranged at regular intervals are converted into colors (white triangles) that are arranged so as to conform to the contour shape of the output color gamut. Therefore, in this case, the color conversion changes a tendency of color variation of even colors inside the contour of the color gamut.

FIG. 17 is a graph showing an example of a variation of the total amount caused by the total amount limitation. As described above, the bending point P appears because the total amount limitation is started at the point P. For example, when a color is varied from the maximum lightness point in FIG. 14 along the contour of the color gamut, the total amount varies as shown in FIG. 17. The coloring material total amount increases as the color varies up to the point P through the point T. The coloring material total amount reaches the total amount limit value at the point P and cannot increase any more. Therefore, the coloring material amount increasing/decreasing method needs to be changed at the point P, which results in that the tendency of color variation is changed at the point P.

For example, JP 2005-236802 A describes the following techniques. In a color conversion table for converting an input color in an input color space into an output color in an output color space, an output color is subjected to a smoothing process or a K (black) component, for example, of output color components is subjected to the smoothing process, and the other color components are predicted based on the resulting K component and the input color. In generating the color conversion table, a total amount limit value is subjected to the smoothing process or a K (black) component of the output color components is further subjected to the smoothing process, and an output color is re-calculated based on the input color. These techniques smooth out a bending point such as the point P and solves such problems as a sharp variation in tone and a drastic variation in the tendency of color variation. In JP 2005-236802 A, although the input color is once converted into the output color, if the total limit value is exceeded, conversion from the input color into another output color is performed again.

SUMMARY

According to an aspect of the invention, a color signal processing apparatus includes a total amount calculating unit, a limit value calculating unit and a correcting unit. The total amount calculating unit calculates a total amount value of an input color signal in an output device color space which has, as color components, colors of coloring materials used in an output device. The limit value calculating unit calculates a limit value for limiting a total amount of a color signal, in accordance with the calculated total amount value. The correcting unit corrects the input color signal in the output device color space so that the total amount value of the input color signal becomes the calculated limit value or less.

BRIEF DESCRIPTION OF THE DRAWINGS

Exemplary embodiments of the invention will be described in detail based on the following figures, wherein.

DETAILED DESCRIPTION

Figure 1:
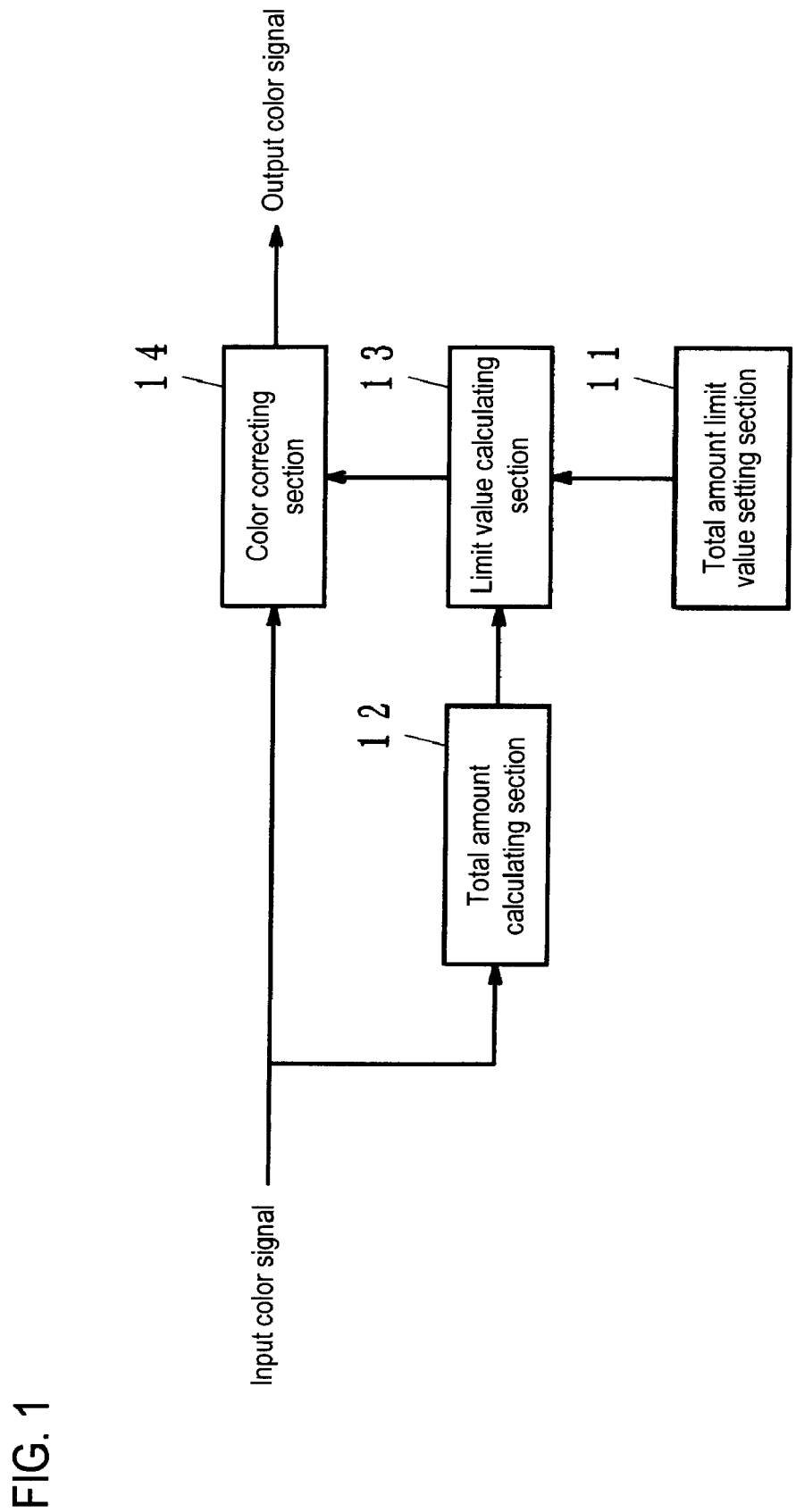
FIG. 1 shows the configuration of a color signal processing apparatus according to a first exemplary embodiment of the invention.

FIG. 1 shows the configuration of a color signal processing apparatus according to a first exemplary embodiment of the invention. In FIG. 1, reference numeral 11 denotes a total amount limit value setting section; reference numeral 12 denotes a total amount calculating section; reference numeral 13 denotes a limit value calculating section; and reference numeral 14 denotes a color correcting section. Output color signals are color signals, which are used in an output device to make outputs using coloring materials and are in an output device color space having, as color components, colors of the coloring materials used in the output device. In this exemplary embodiment, it is assumed that input color signals are also color signals in the output device color space. In this exemplary embodiment, the color components of the output device color space include black. A specific example of the output device color space is the CMYK color space.

A total amount limit value, which is a maximum total amount of the coloring materials that is permitted in the output device, is set in the total amount limit value setting section 11. The total amount limit value may be given in advance. Alternatively, the total amount limit value setting section 11 may be configured so as to receive the total amount limit value from an external apparatus, or may be configured so that a user sets the total amount limit value.

The total amount calculating section 12 calculates a total amount value of the input color signal. Since the input color signal is a color signal in the output device color space having, as the color components, the colors of the coloring materials used in the output device, the total amount value is calculated by adding values of the respective color components of the input color signal.

Figure 2:
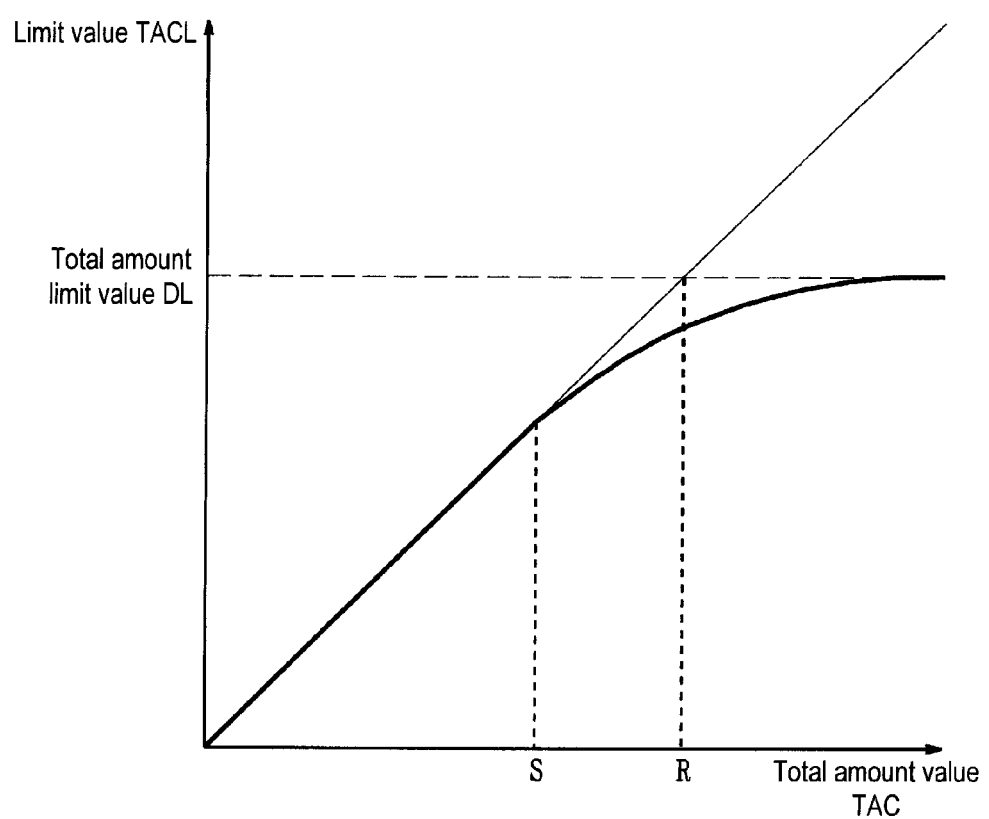
FIG. 2 is a graph showing an example of a relationship between a total amount value and a limit value.

The limit value calculating section 13 calculates a limit value for limiting a total amount of a color signal, in accordance with the total amount value calculated by the total amount calculating section 12. FIG. 2 is a graph showing an example of a relationship between the total amount value and the limit value. For example, the limit value calculating section 13 starts limiting a total amount from a total amount value which is smaller than the total amount limit value by a predetermined amount, and controls the limit value according to the total amount value so that the limit value approaches the total amount limit value gradually as the total amount value increases. FIG. 2 shows an example of the limit value in this case. In this example, TAC denotes the total amount value of the input color signal, DL denotes the total amount limit value in the output device, and TACL denotes the limit value. A point R is a point where the total amount value TAC of the input color signal becomes equal to the total amount limit value DL in the output device. A point S is a point which is smaller in total amount than the point R by the predetermined amount and a point where the limit value calculating section 13 starts control for making the limit value TACL smaller than the total amount value TAC of the input color signal. In a range of TAC≦S, TACL is equal to TAC. In a range of TAC>S, TACL is calculated according to the following equation.

$$TACL = \tan h\{(TAC-S)/(DL-S)\} \cdot (DL-S) + S$$

It is noted that the method for controlling the limit value according to the total amount value is arbitrary.

If a control were made in such a manner that the limit value TACL is set equal to the total amount limit value DL after the total amount value TAC of the input color signal reaches the total amount limit value DL, the characteristic would be changed at the point R to influence an image quality. In contrast, influence on the image quality is avoided by controlling the limit value TACL gradually according to the total amount value TAC in the manner shown in FIG. 2.

The color correcting section 14 corrects the input color signal in the output device color space so that the total amount value of the corrected input color signal becomes equal to or less than the limit value calculated by the limit value calculating section 13. Now, let the input color signal and the output color signal be represented by (C, M, Y, K) and (C', M', Y', K'), respectively. If (C+M+Y+K)≦TACL, C', M', Y', and K' are made equal to C, M, Y, and K, respectively; that is, the input color signals themselves are used as the output color signals. If (C+M+Y+K)>TACL, the components, other than black, of the input color signal are decreased with black being fixed, so that the total amount value of the corrected input color signal becomes the limit value TACL or less. For example, a correction is made in the following manner:

$$K' = K$$

$$C' = C \cdot \{(TACL-K)/(C+M+Y)\}$$

$$M' = M \cdot \{(TACL-K)/(C+M+Y)\}$$

$$Y' = Y \cdot \{(TACL-K)/(C+M+Y)\}$$

Alternatively, the respective color components may be decreased at an equal rate so that the total amount value of the corrected input color signal becomes the limit value TACL or less. For example, a correction may be made in the following manner:

$$K' = K \cdot \{TACL/(K+C+M+Y)\}$$

$$C' = C \cdot \{TACL/(K+C+M+Y)\}$$

$$M' = M \cdot \{TACL/(K+C+M+Y)\}$$

$$Y' = Y \cdot \{TACL/(K+C+M+Y)\}.$$

Since the correction process is performed only in the output device color space, the correction is made at high speed.

With the above configuration, in the output device color space, an input color signal is corrected to an output color signal that satisfies the total amount limit value and does not cause deterioration in tone characteristic such as a color inversion or a color discontinuity even if the total amount value of the input color signal is around the total amount limit value.

Figure 3:
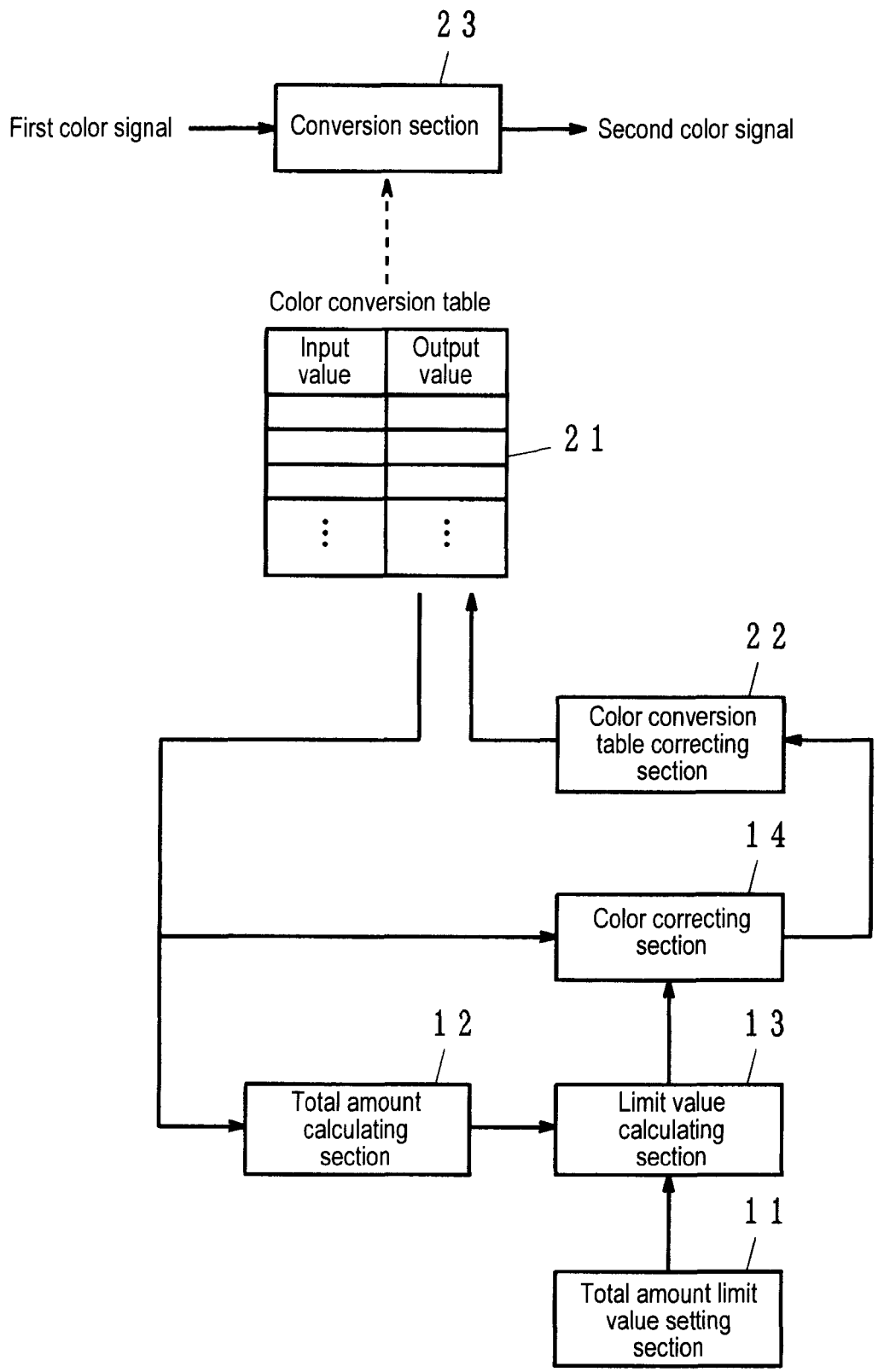
FIG. 3 shows the configuration of a color signal processing apparatus according to a second exemplary embodiment of the invention.

FIG. 3 shows the configuration of a color signal processing apparatus according to a second exemplary embodiment of the invention. In FIG. 3, reference numeral 21 denotes a color conversion table; reference numeral 22 denotes a color conversion table correcting section; and reference numeral 23 denotes a conversion section. In the second exemplary embodiment, the color conversion table correcting section 22 is added to the configuration of the first exemplary embodiment, and color signal values in the output device color space, which are set in the color conversion table 21, are rewritten to color signal values that satisfy the total amount limit value. The conversion section 23 for converting a first color signal into a second color signal using the color conversion table 21 is also shown in FIG. 3.

The color conversion table 21 is used when the conversion section 23 performs a color conversion process from a first color signal into a second color signal, and the color conversion table 21 correlates a certain number of sets of first color signal values with sets of second color signal values into which the sets of first color signal values are to be converted, respectively. The first color signals may be color signals in a predetermined arbitrary color space such as the RGB color space or the CIELAB color space. It is assumed here that the second color signals are color signals in the output device color space. It is also assumed that the color conversion table 21 has been set in advance by a user or has been generated separately and set in advance.

The total amount calculating section 12 receives the second color signals, which are output values of the color conversion table 21, as input signals and calculates a total amount value of each input color signal. The limit value calculating section 13 calculates limit values in accordance with the total amount values of the input color signals. The color correcting section 14 corrects each input color signal so that the total amount value of each corrected input color signal becomes the corresponding limit value or less. The sections 12-14 are the same as described in the first exemplary embodiment. Therefore, corrected output color signals satisfy the total amount limit value, and hence do not cause deterioration in tone characteristic such as a color inversion or a color discontinuity.

The color conversion table correcting section 22 rewrites the output values of the color conversion table 21 to the output color signals corrected by the color correcting section 14. As a result, the color conversion table 21 comes to satisfy the total amount limit value and does not cause deterioration in the tone characteristic.

The conversion section 23 converts a first color signal into a second color signal using the corrected color conversion table 21. Since the output values of the color conversion table 21 have been corrected to as to satisfy the total amount limit value and do not cause deterioration in the tone characteristic, the second color signal also satisfies the total amount limit value and does not cause deterioration in the tone characteristic. The conversion section 23 may be provided in, for example, a different apparatus than the other sections so long as it can refer to the color conversion table 21.

Figure 4:
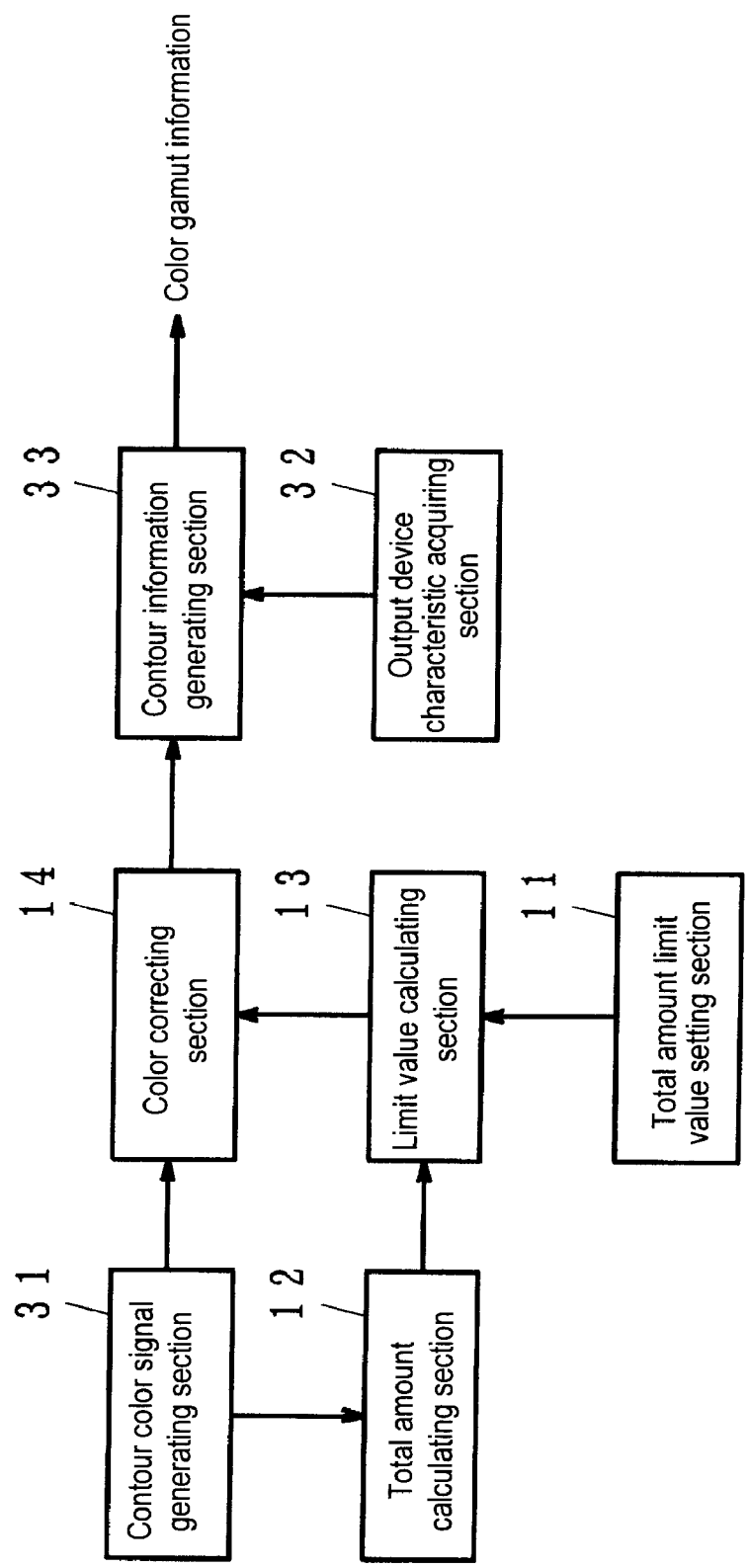
FIG. 4 shows the configuration of a color signal processing apparatus according to a third exemplary embodiment of the invention.

FIG. 4 shows the configuration of a color signal processing apparatus according to a third exemplary embodiment of the invention. In FIG. 4, reference numeral 31 denotes a contour color signal generating section; reference numeral 32 denotes an output device characteristic acquiring section; and reference numeral 33 denotes a contour information generating section. In the third exemplary embodiment, the contour color signal generating section 31, the output device characteristic acquiring section 32, and the contour information generating section 33 are added to the configuration of the first exemplary embodiment, and a contour of the color gamut that satisfies a total amount limit value and does not cause deterioration in the tone characteristic.

Figure 5:
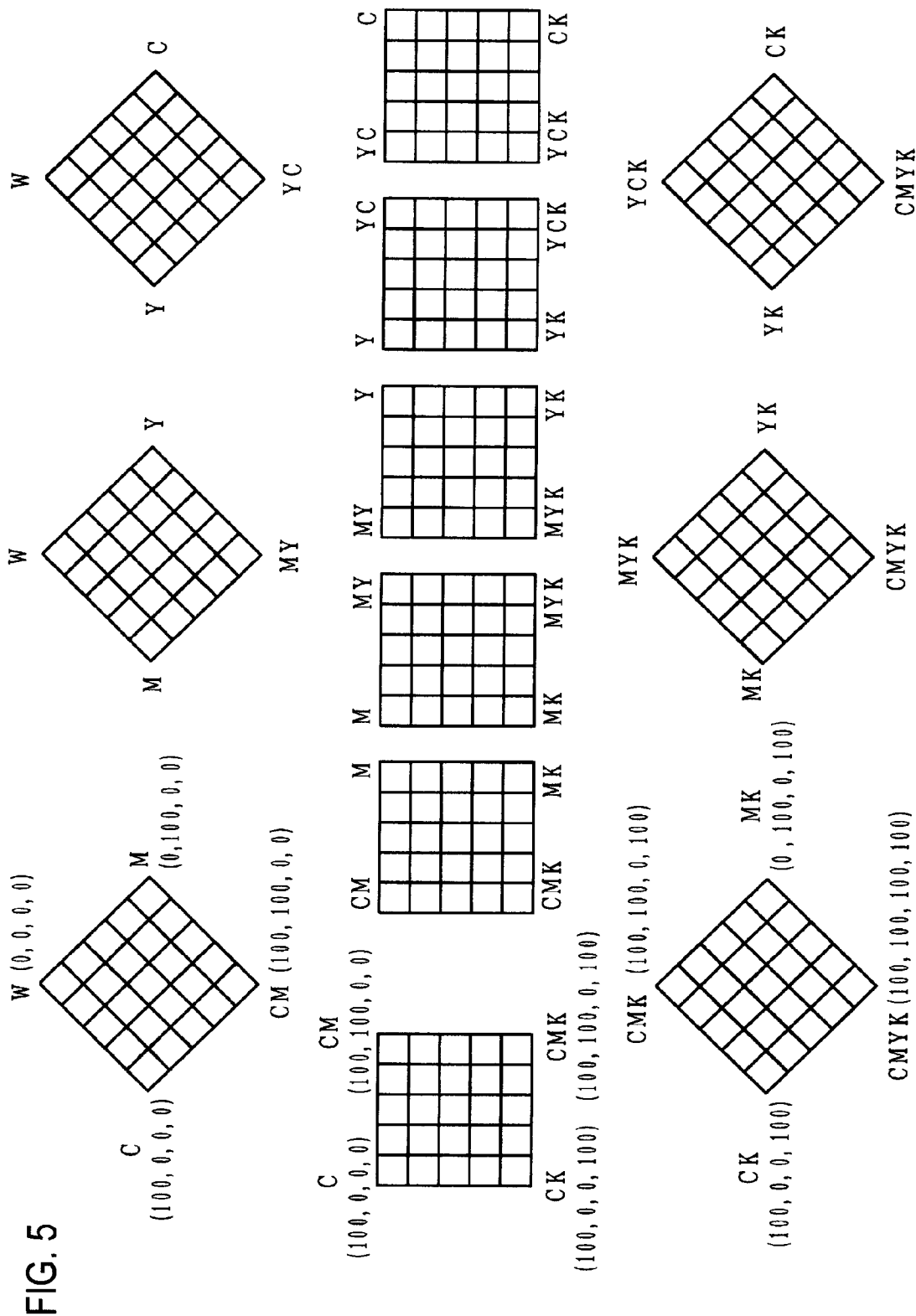
FIG. 5 illustrates a contour of a color gamut in an output device color space.

The contour color signal generating section 31 generates color signals in the color gamut of the output device color space. FIG. 5 illustrates a contour of the color gamut in the output device color space. FIG. 5 shows the contour in the case where the output device color space is CMYK. It is assumed that each color component can take 0% to 100%. A color W indicates a color in which all C, M, Y, and K are 0%. The other colors indicate colors in which the color component (s) shown is 100%. For example, a color represented by C is a color in which C is equal to 100% and M, Y, and K are 0%. A color represented by MK is a color in which M and K are 100% and C and Y are 0%. A color represented by CMYK is a color in which C, M, Y, and K are 100%. In this example, lattice points are obtained by dividing the range 0% to 100% of each color component into five equal parts. The lattice points are generated sequentially as contour color signals. It is noted that the division number etc. may be selected arbitrarily.

The total amount calculating section 12 calculates a total amount value of each of input color signals, which are contour color signals generated by the contour color signal generating section 31. The limit value calculating section 13 calculates a limit value in accordance with the total amount value of each input color signal (each contour color signal). The color correcting section 14 corrects each input color signal so that the total amount value of each corrected input color signal becomes the corresponding limit value or less. The sections 12-14 are the same as described in the first exemplary embodiment. Therefore, the corrected contour color signals are in the color gamut that satisfies the total amount limit value and does not to cause deterioration in the tone characteristic such as a color inversion or a color discontinuity. For colors that are known in advance to satisfy the total amount limit value such as primary colors (a color consisting of any of single coloring materials) and secondary colors each consisting of two components, the process may be transferred to the contour information generating section 33 with the process by the color correcting section 14 being skipped.

The output device characteristic acquiring section 32 acquires a corresponding relationship between sets of color signals, in the output device color space, given to the output device and colors that are output from the output device based on those sets of color signals. For example, where the output device color space is the CMYK color space, CMYK color signals are supplied to the output device, color signals in a device-independent color space such as the CIELAB color space are acquired by measuring the colors output from the output device, and the CMYK color signals and the resulting Lab color signals are paired as an output device characteristic. Where the contour of the color gamut in the output device color space is to be obtained as color gamut information, the output device characteristic acquiring section 32 may not be provided.

The contour information generating section 33 generates color gamut information based on the corrected contour color signals that are received from the color correcting section 14. For example, when the contour of the color gamut in the output device color space is to be generated, the corrected contour color signals themselves that are received from the color correcting section 14 can be used as the color gamut information. When color gamut information in a device-independent color space such as the CIELAB color space is to be generated, the contour information generating section 33 does so by converting the corrected contour color signals, which are received from the color correcting section 14, into color signals in the device-independent color space by referring to the output device characteristic acquired by the output device characteristic acquiring section 32.

On the contour of the color gamut indicated by the color gamut information thus generated, the tendency of color variation does not change sharply at a point corresponding to the total amount limit value of the output device. And, the tone characteristic is not deteriorated even in the case of colors on the contour.

Figure 6:
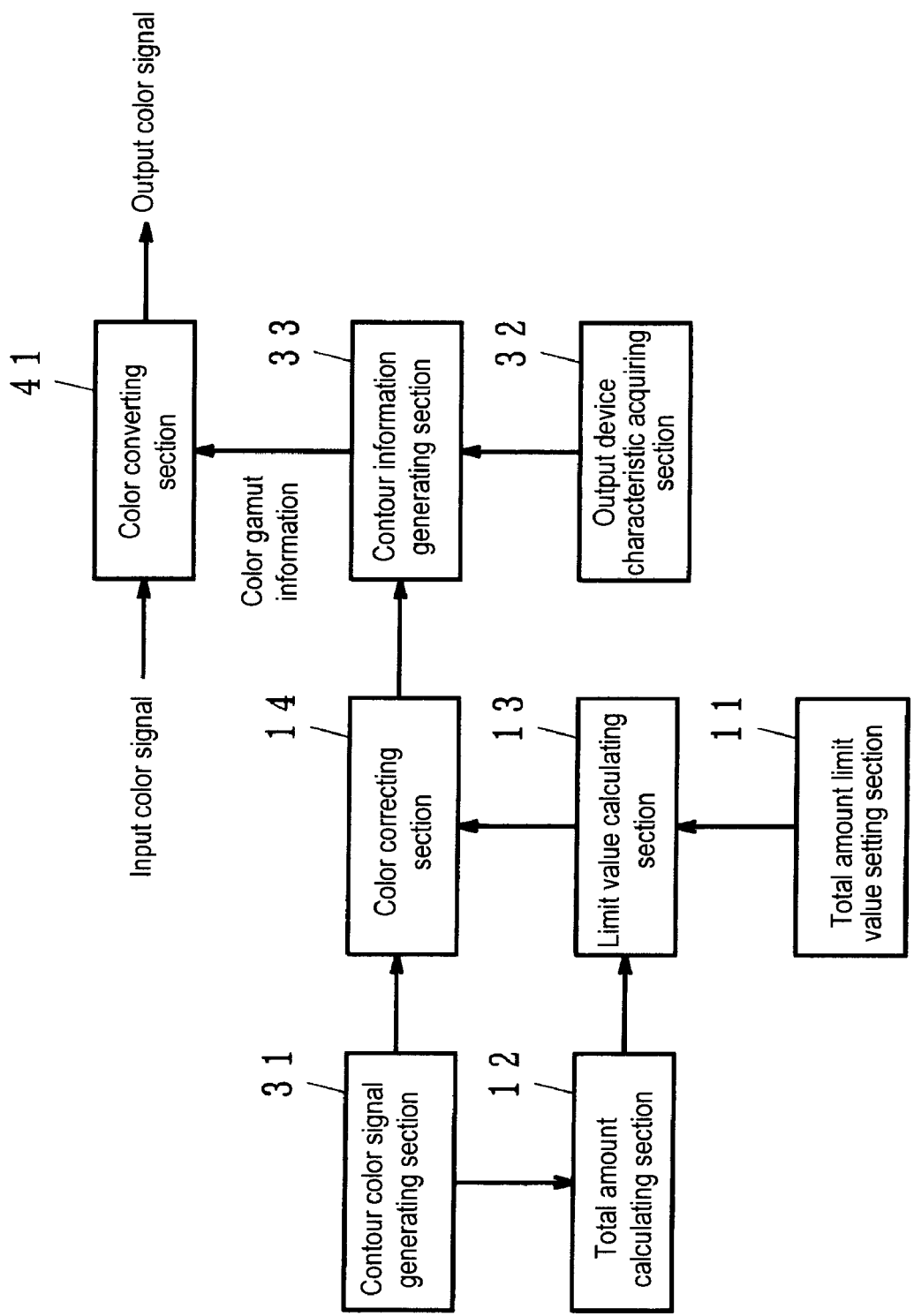
FIG. 6 shows the configuration of a color conversion apparatus according to a fourth exemplary embodiment of the invention.

FIG. 6 shows the configuration of a color conversion apparatus according to a fourth exemplary embodiment of the invention. In FIG. 6, reference numeral 41 denotes a color converting section. In the fourth exemplary embodiment, the color converting section 41 is added to the configuration of the third exemplary embodiment, and a color gamut conversion process is performed.

The color converting section 41 uses the color gamut information generated by the contour information generating section 33 to convert an arbitrary color signal into a color signal in a color gamut that is indicated by the color gamut information. For example, the color converting section 41 may convert a color outside the color gamut indicated by the color gamut information into a color on the contour of the color gamut or convert input color signals including colors inside the contour of the color gamut indicated by the color gamut information into color signals in the color gamut indicated by the color gamut information.

Figure 7:
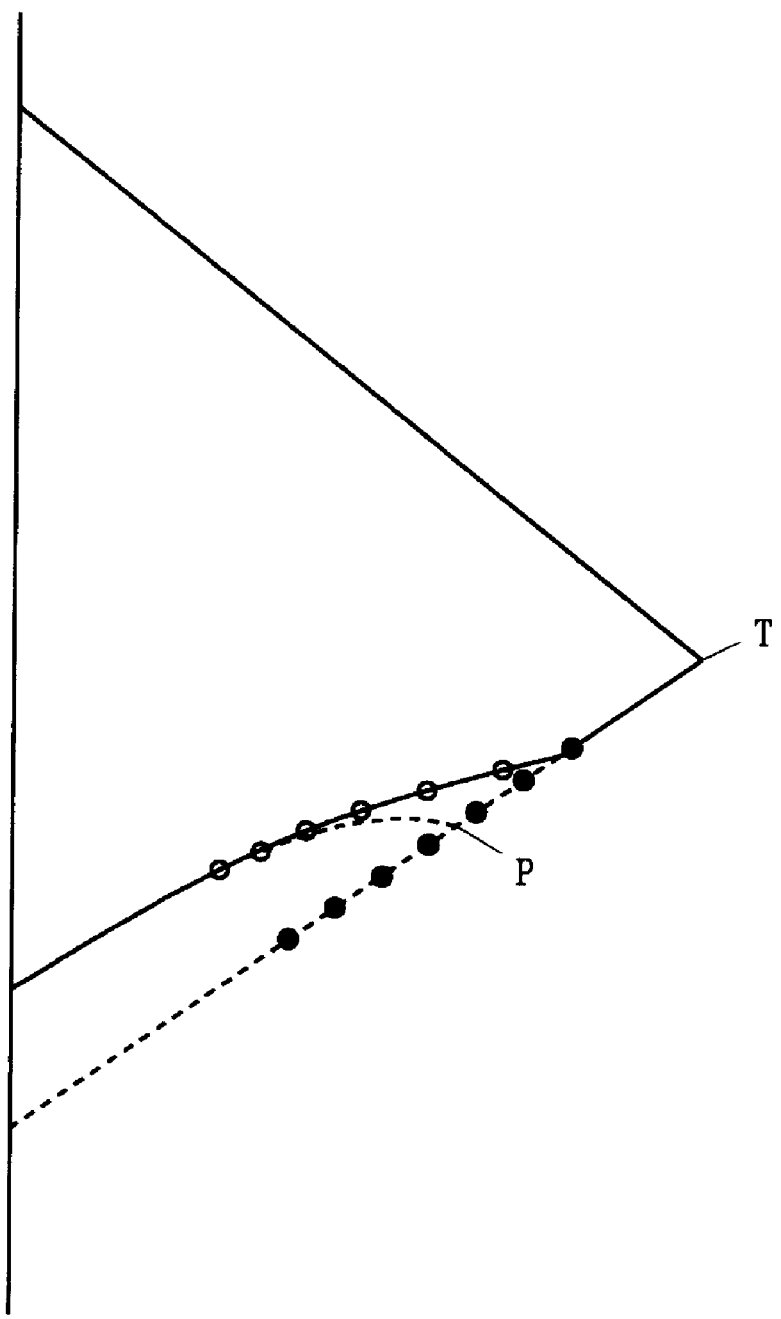
FIG. 7 is a chart illustrating a specific example of a color gamut conversion process according to the fourth exemplary embodiment of the invention.

FIG. 7 is a chart illustrating a specific example of the color gamut conversion process according to the fourth exemplary embodiment of the invention. FIG. 7 shows a lightness-chroma plane taken at a certain hue. In FIG. 7, a solid line represents a contour indicated by the color gamut information, which is generated by the contour information generating section 33, and a broken line represents a contour of the case that total amount limitation is not considered. For example, assume that color signals (indicated by black circles) are input that gradually vary along the contour of the case that the total amount limitation is not considered. The color converting section 41 converts the input color signals into color signals in the color gamut that is indicated by the color gamut information. In this example, the input color signals are converted into color signals (indicated by white circles) on the contour of the color gamut indicated by the color gamut information. Since the contour of the color gamut indicated by the color gamut information has no sharply bent point, the converted color signals reflect the manner of color variation of the input color signals, almost completely. Therefore, the converted color signals do not deteriorate the tone characteristic and, naturally, satisfy the total amount limit value.

Figure 8:
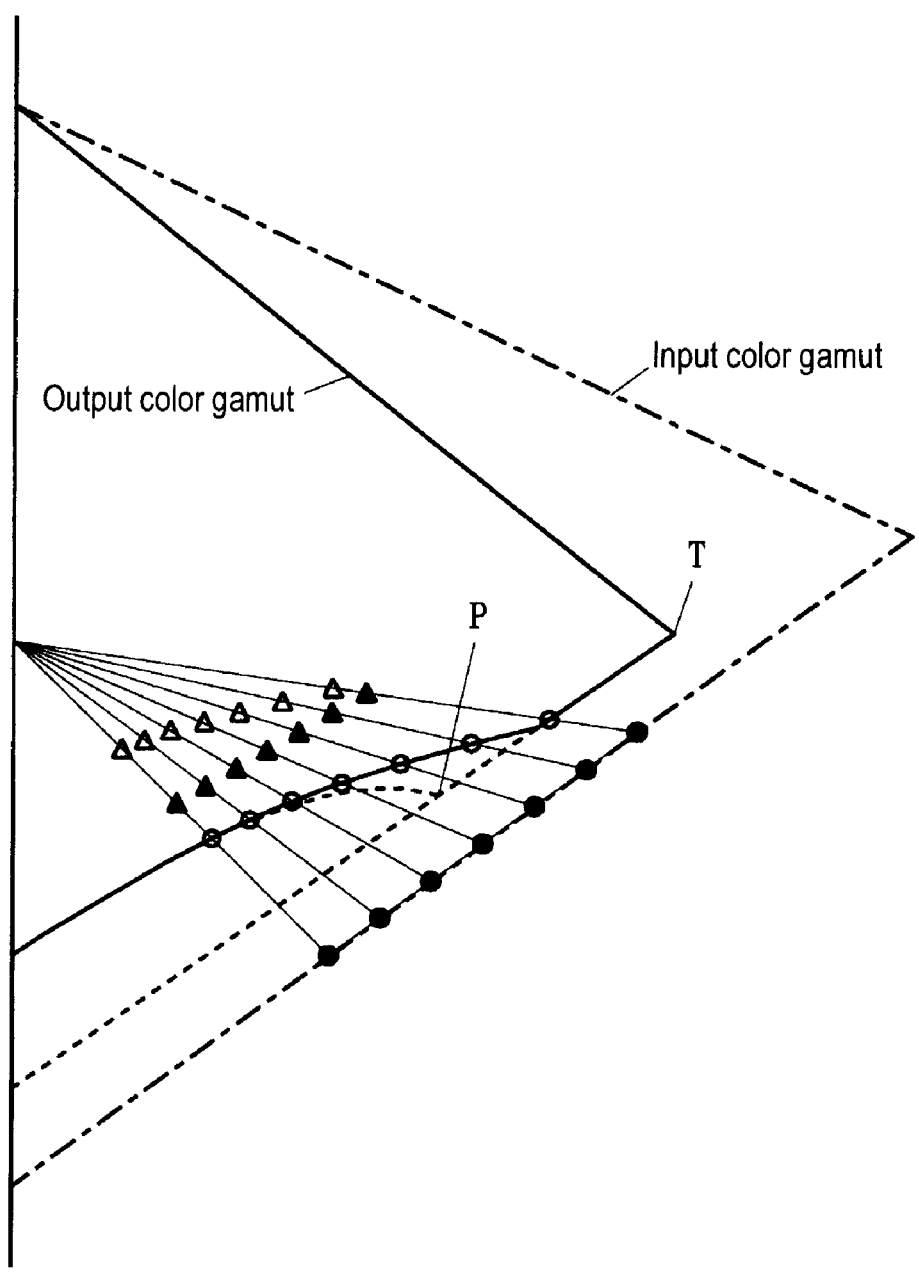
FIG. 8 is a chart illustrating another specific example of the color gamut conversion process according to the fourth exemplary embodiment of the invention.

FIG. 8 is a chart illustrating another specific example of the color gamut conversion process according to the fourth exemplary embodiment of the invention. In this example, a color gamut of input color signals (input color gamut) is known, and a process of changing the input color gamut so that it becomes identical to the color gamut (output color gamut) indicated by the color gamut information. In this example, a color conversion is performed along a straight line connecting a predetermined point on the lightness axis and input color signals according to the ratio of the distance between the predetermined point and the contour of the output color gamut to the distance between the predetermined point and the contour of the input color gamut.

For example, when the above-described color conversion is performed, colors (indicated by black circles) on the contour of the input color gamut are converted into colors (indicated by white circles) on the contour of the output color gamut. Also, colors (indicated by black triangles) inside the contour of the input color gamut are converted into colors (indicated by white triangles) inside the contour of the output color gamut. As described in the third exemplary embodiment, the contour of the color gamut indicated by the color gamut information does not change sharply at a point corresponding to the total amount limit value of the output device. Therefore, input color signals are converted into colors in the output color gamut in such a manner that the tone characteristic in the output color gamut is not deteriorated from that in the input color gamut. This is also seen from FIG. 8.

Figure 9:
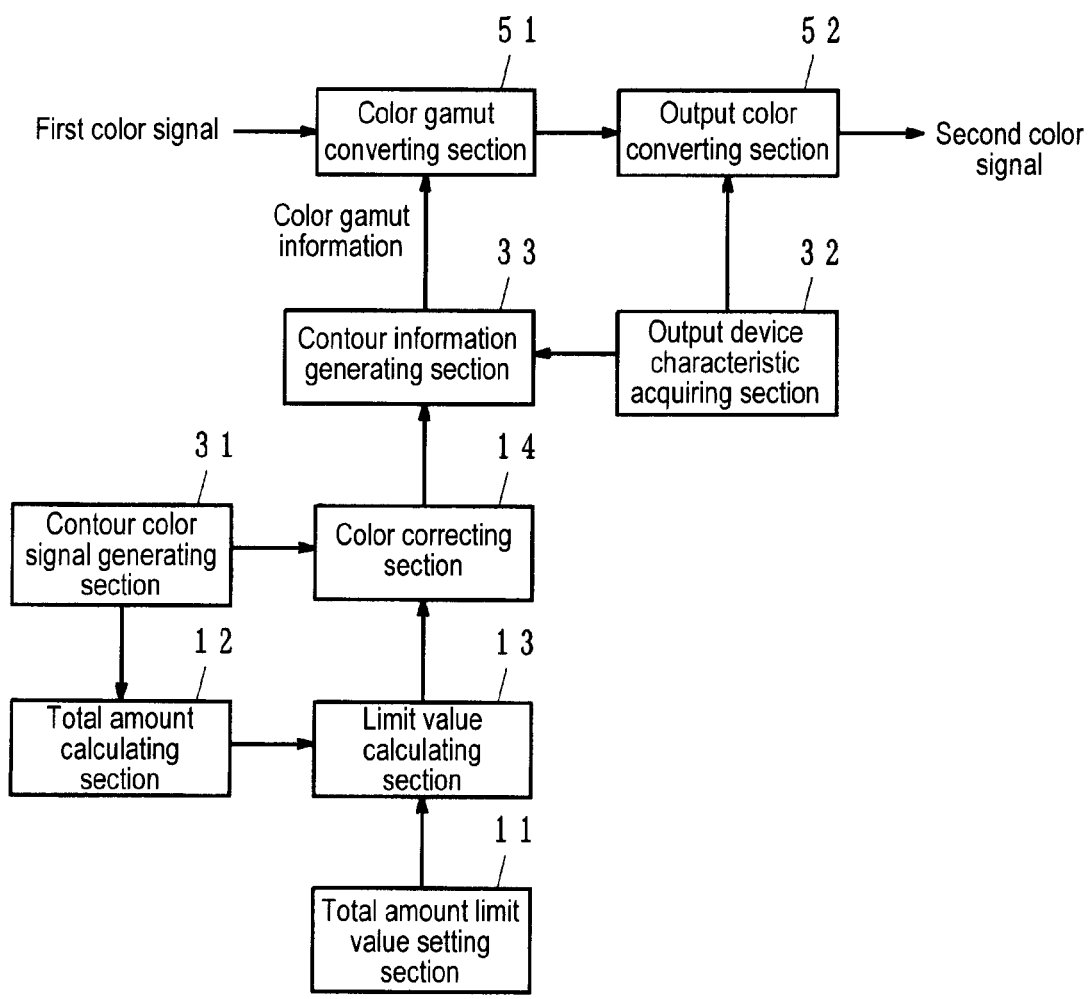
FIG. 9 shows the configuration of a color conversion apparatus according to a fifth exemplary embodiment of the invention.

FIG. 9 shows the configuration of a color conversion apparatus according to a fifth exemplary embodiment of the invention. In FIG. 9, reference numeral 51 denotes a color gamut converting section, and reference numeral 52 denotes an output color converting section. In the fifth exemplary embodiment, the color gamut converting section 51 and the output color converting section 52 are added to the configuration of the third exemplary embodiment, and a first color signal in an input color space such as a device-independent color space is subjected to a color gamut conversion process in the input color space and is, then, converted into a second color signal in the output device color space.

The color gamut converting section 51 converts the first color signal in the input color space into a color signal in a color gamut of the output device that is indicated by the color gamut information in the input color space, using the color gamut information generated by the contour information generating section 33. For example, the color gamut converting section 51 may convert a color outside the color gamut indicated by the color gamut information into a color on the contour of the color gamut or convert input color signals including colors inside the contour of the color gamut indicated by the color gamut information so that the resultant color signals fall within the color gamut. The contour information generating section 33 of the fifth exemplary embodiment outputs the color gamut information which has been converted into color gamut information in the input color space.

The output color converting section 52 converts the color signals generated by the color gamut converting section 51 into a second color signals in the output device color space, using the output device characteristic acquired by the output device characteristic acquiring section 32. For example, the output color converting section 52 may generate a color conversion model based on the output device characteristic and performs conversion using the color conversion model.

The contour of the color gamut indicated by the color gamut information used by the color gamut converting section 51 controls total amount values based on the limit values according to the total amount values of the contour points so that the manner of color variation does not change sharply at a point corresponding to a total amount limit value. Therefore, color signals produced by the color gamut converting section 51 reflect the color variation tendency of input first color signals. As a result, second color signals produced by the output color converting section 52 do not cause deterioration in tone characteristic such as a color inversion or a color discontinuity, either. It goes without saying that the second color signals satisfy the total amount limit value.

There may occur a case that a black generation condition such as limitation of the amount of black used is set in connection with conversion, by the output color converting section 52, into second color signals in the output device color space because black particularly influences the image quality. In this case, the output color converting section 52 generates a limited black amount according to the thus-set black generation condition and calculates the other color components using the black amount.

Figure 10:
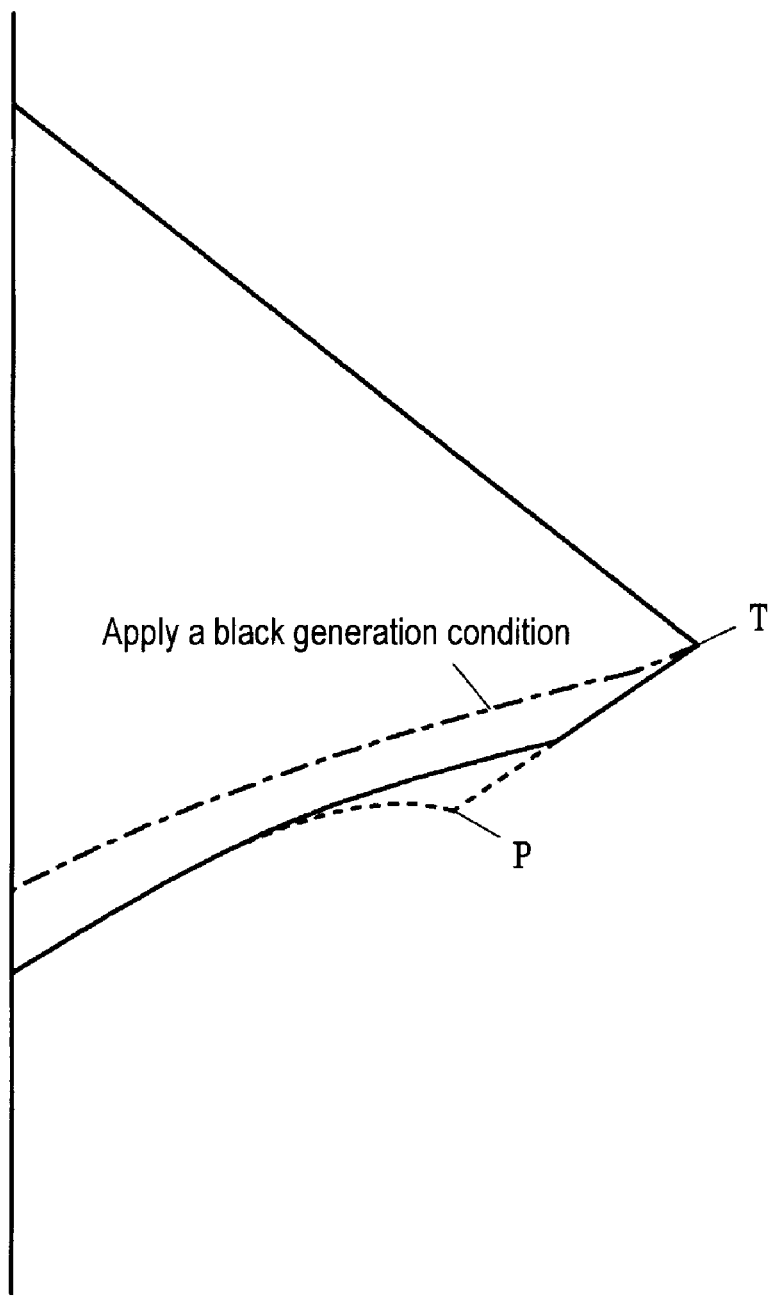
FIG. 10 is a chart illustrating an example of a color gamut of the case that a black generation condition is set.

FIG. 10 is a chart illustrating an example of a color gamut of the case that the black generation condition is set. Where the black generation condition is applied, the use of colors whose black amount is large is avoided, as a result of which the color gamut is narrowed in low-lightness colors. In FIG. 10, a broken line represents a contour of the color gamut of the case that a total amount limit value is applied, a solid line represents a contour of the color gamut indicated by the color gamut information generated by the contour information generating section 33, and a chain line represents a contour of the color gamut of the case that the black amount is limited according to a black generation condition as an additional measure. As seen from FIG. 10, the color gamut is narrowed when the black generation condition is set.

Figure 11:
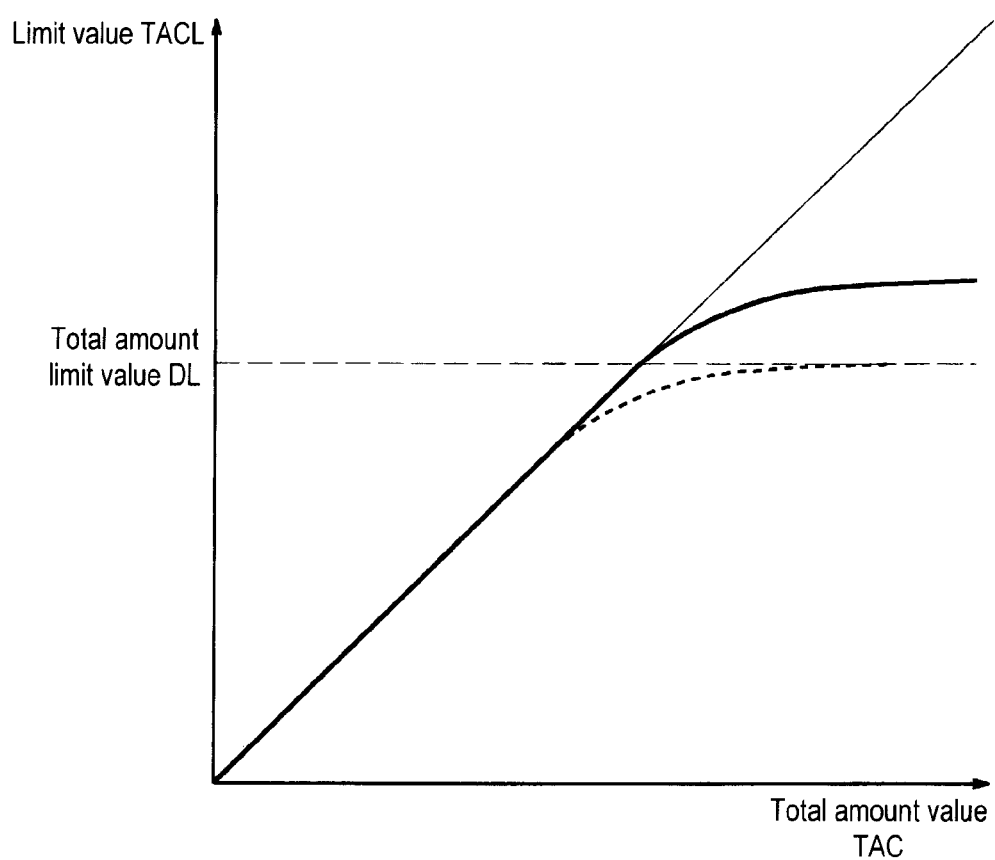
FIG. 11 is a graph showing an example of a relationship between the total amount value and the limit value in the case that a value that is larger than a total amount limit value is set as an upper limit of the limit value.
Figure 12:
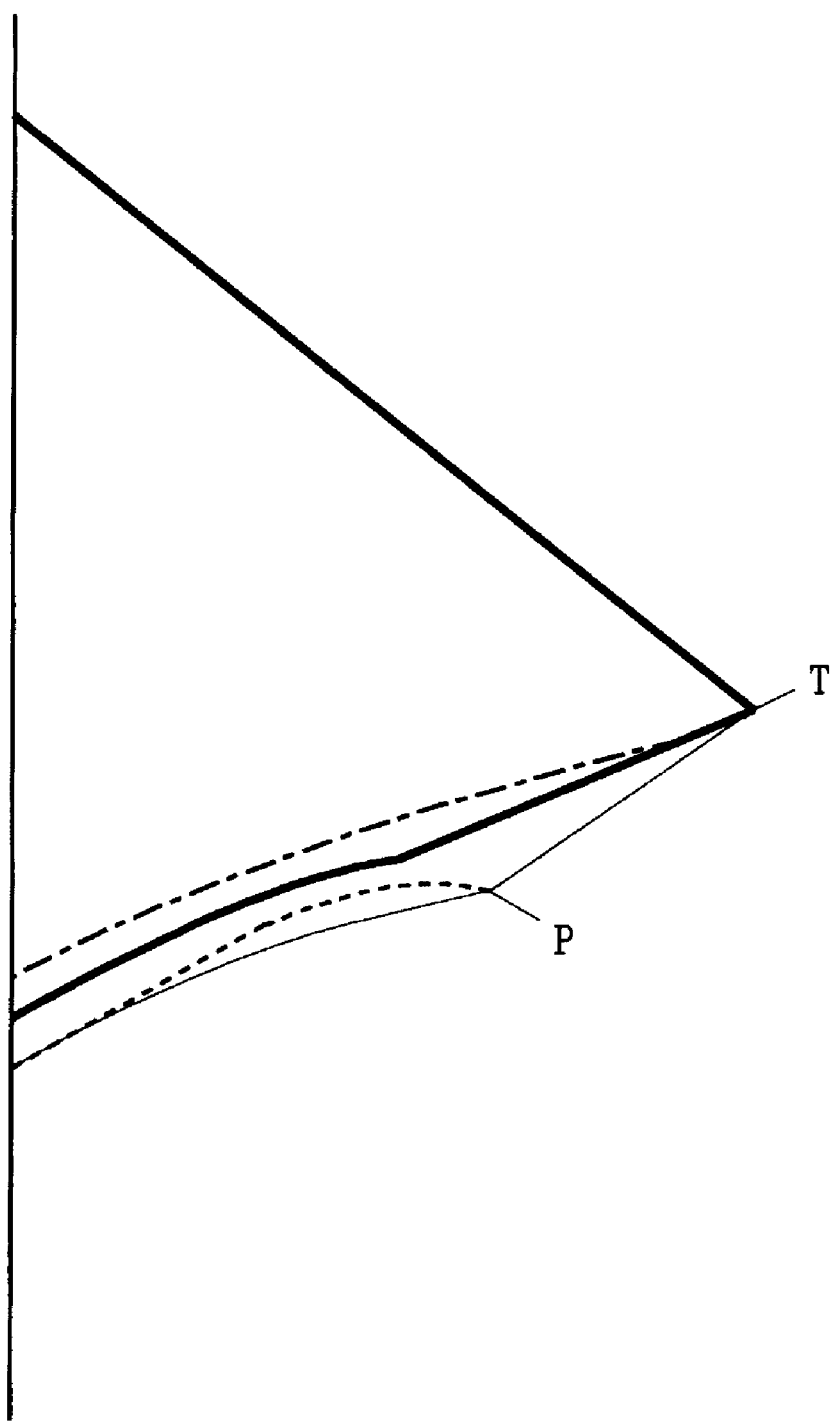
FIG. 12 is a chart illustrating an example of a color gamut in the case that the value that is larger than the total amount limit value is set as the upper limit of the limit value.

In this case, the limit value calculating section 13 may control a limit value corresponding to a total amount value by setting an upper limit that is larger than the total amount limit value of the output device. FIG. 11 is a graph showing an example of a relationship between the total amount value and the limit value in the case that a value that is larger than the total amount limit value is set as an upper limit of the limit value. FIG. 12 is a chart illustrating an example of a color gamut in the case that the value, which is larger than the total amount limit value, is set as the upper limit of the limit value. As indicated by a solid line in FIG. 11, the limit value increases gently according to the total amount value. Thereby, the limit value is made larger than the total amount limit value in a range where the total amount value is large. In this example, when the total amount value becomes equal to the total amount limit value, the limit value starts to be made gradually smaller than the total amount value.

The color correcting section 14 corrects contour color signals generated by the contour color signal generating section 31, using a limit value that is calculated under the above control. The contour information generating section 33 generates the color gamut information based on the corrected contour color signals. A contour of the color gamut indicated by the generated color gamut information is represented by a thin solid line in FIG. 12.

The color gamut converting section 51 converts first color signals in the input color space into color signals in the color gamut of the output device, which is indicated by the color gamut information in the input color space. Although the color gamut information generated by the contour information generating section 33 does not necessarily satisfy the total amount limit value of the output device, the contour does not have a portion where the tendency of color variation changes sharply. Therefore, the tone characteristic after the conversion is kept the same as before the conversion.

The output color converting section 52 converts the color signals produced by the color gamut converting section 51 into second color signals in the output device color space. In doing so, the output color converting section 52 generates a black amount so that the black generation condition is satisfied and calculates the other color components of the second color signals using the generated black amount and the color signals produced by the color gamut converting section 51.

A contour of the color gamut obtained as a result of application of the black generation condition is represented by a thick solid line in FIG. 12. It is seen that by setting the upper limit of the limit value larger than the total amount limit value, the post-conversion color gamut is made wider than in the case that the upper limit of the limit value is set equal to the total amount limit value (chain line).

The color gamut indicated by the outline information obtained by setting the upper limit of the limit value larger than the total amount limit value has a portion where the total amount limit value of the output device is not satisfied. Therefore, there may occur the case that the total amount of second color signals produced by the output color converting section 52 exceeds the total amount limit value though the black generation condition is applied. In such a case, a correction may be made so that the total amount falls within the total amount limit value by changing the black generation condition (e.g., increasing the black amount).

Figure 13:
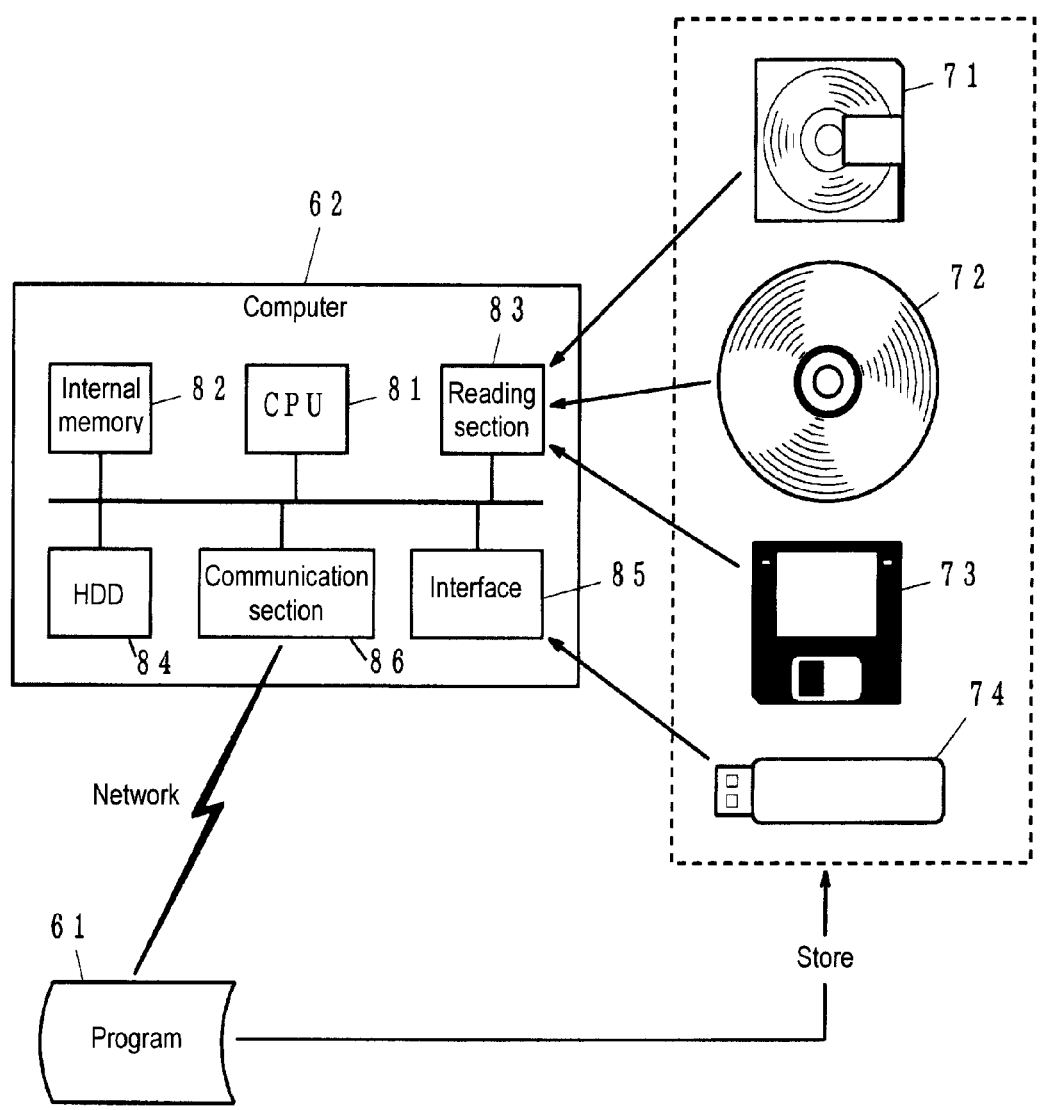
FIG. 13 shows an example of a computer program, a storage media storing the computer program, and a computer in the case that the functions of any of the exemplary embodiments of the invention are implemented as the computer program.
Figure 14:
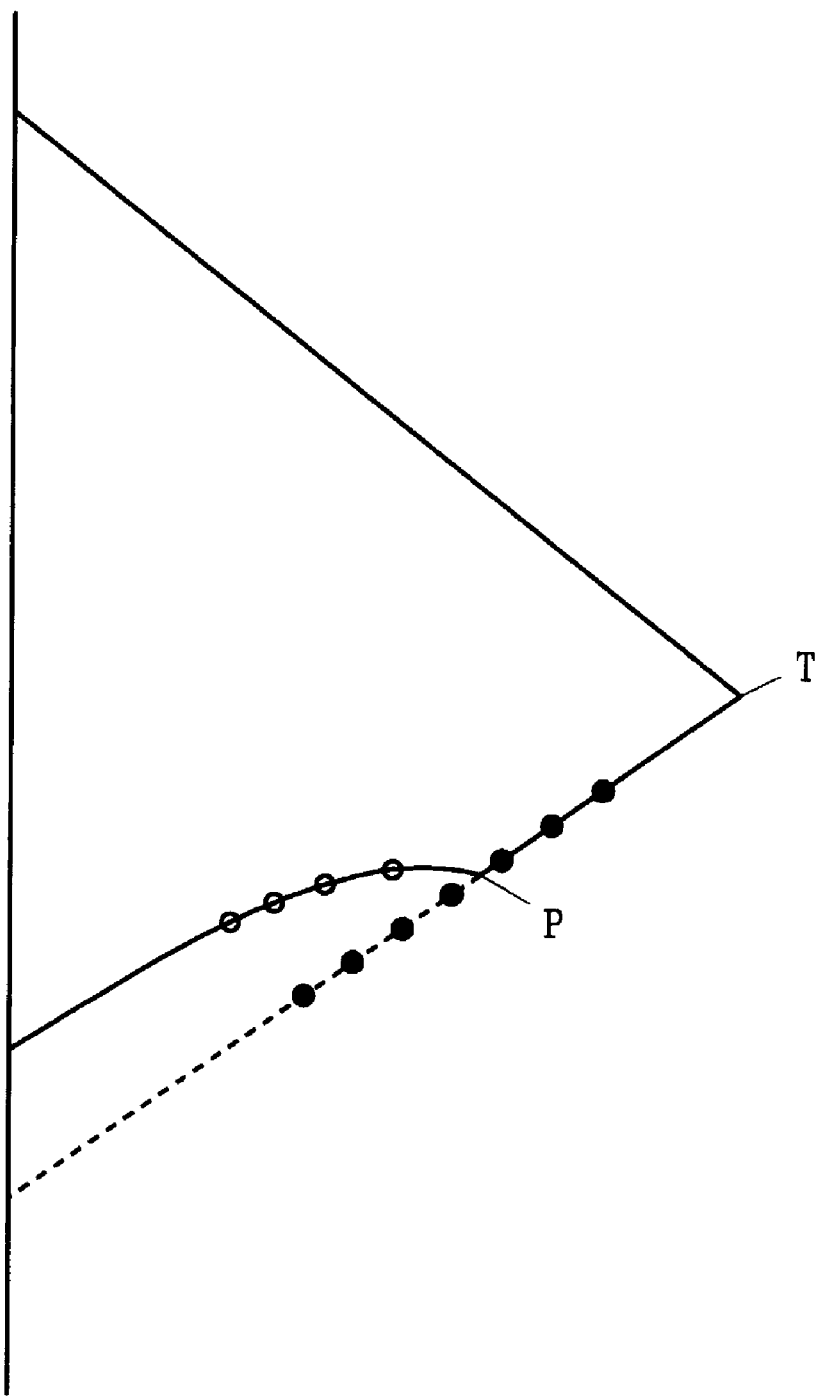
FIG. 14 is a schematic chart illustrating an example of a color gamut of an output device to which a total amount limitation is imposed.
Figure 15:
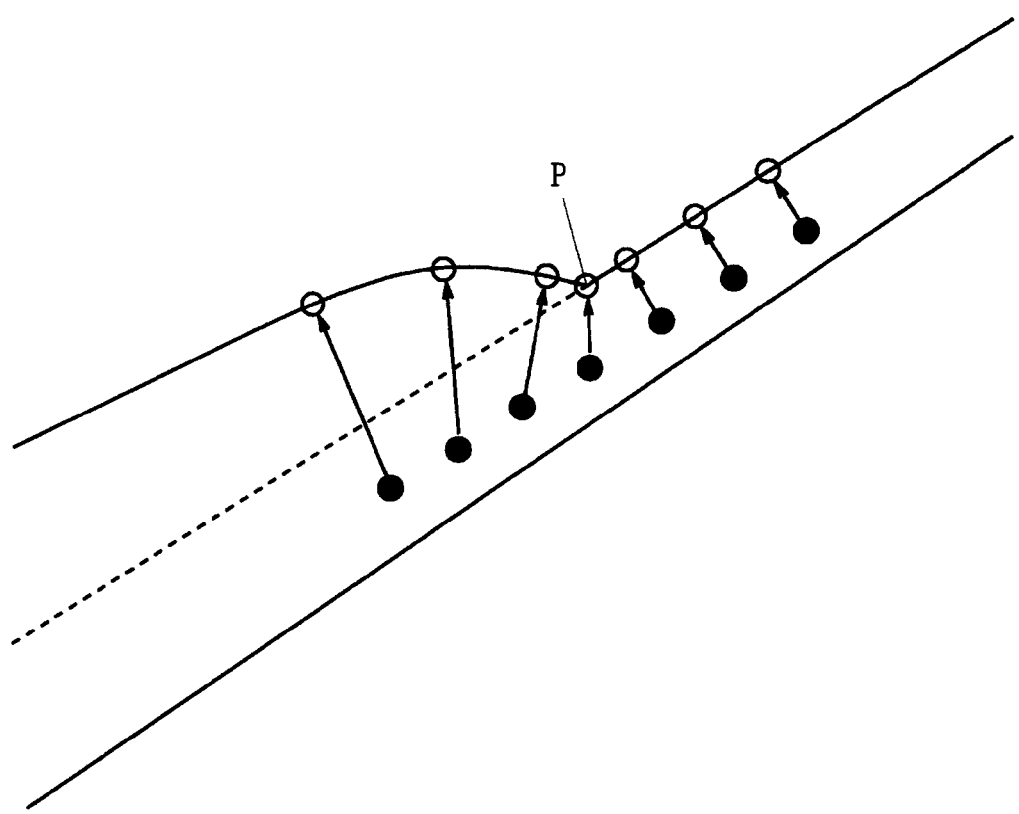
FIG. 15 is a detailed chart illustrating an example of color conversion into the color gamut of the output device to which the total amount limitation is imposed.
Figure 16:
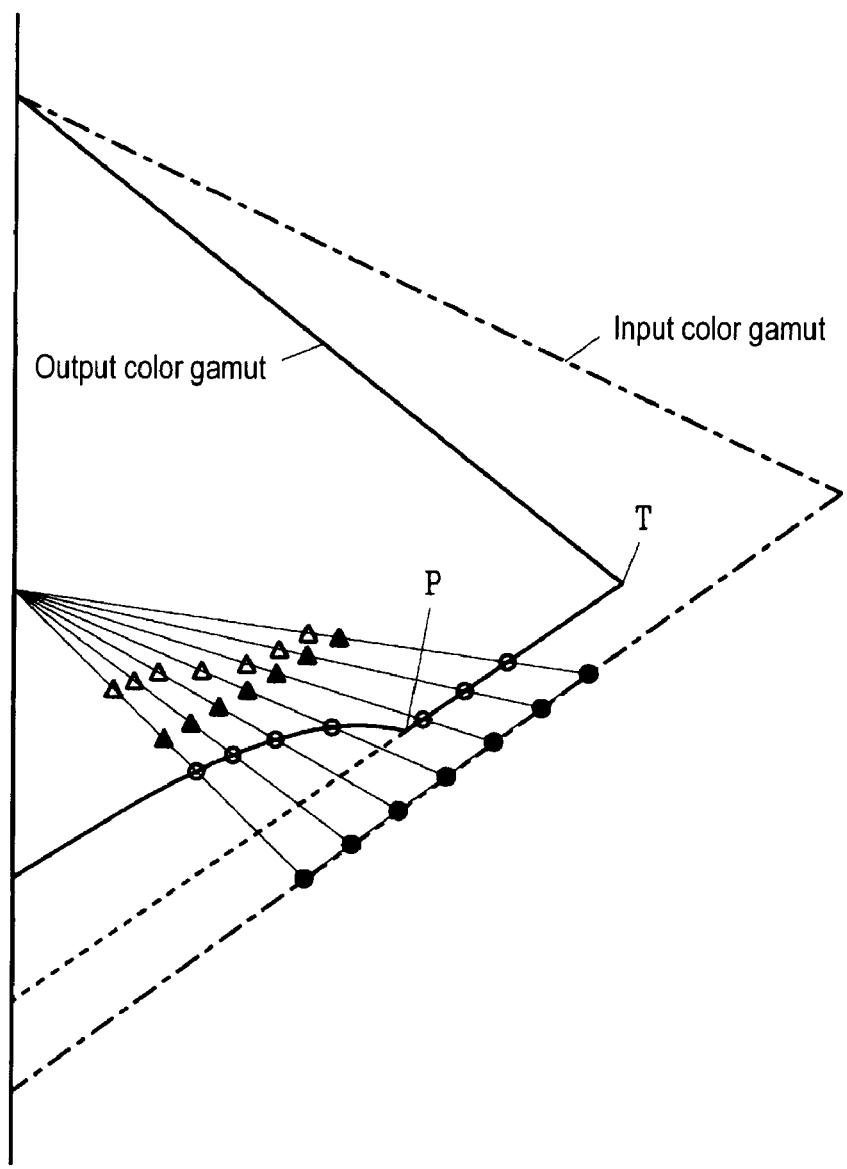
FIG. 16 is a chart illustrating another example of the color conversion into the color gamut of the output device to which the total amount limitation is imposed.
Figure 17:
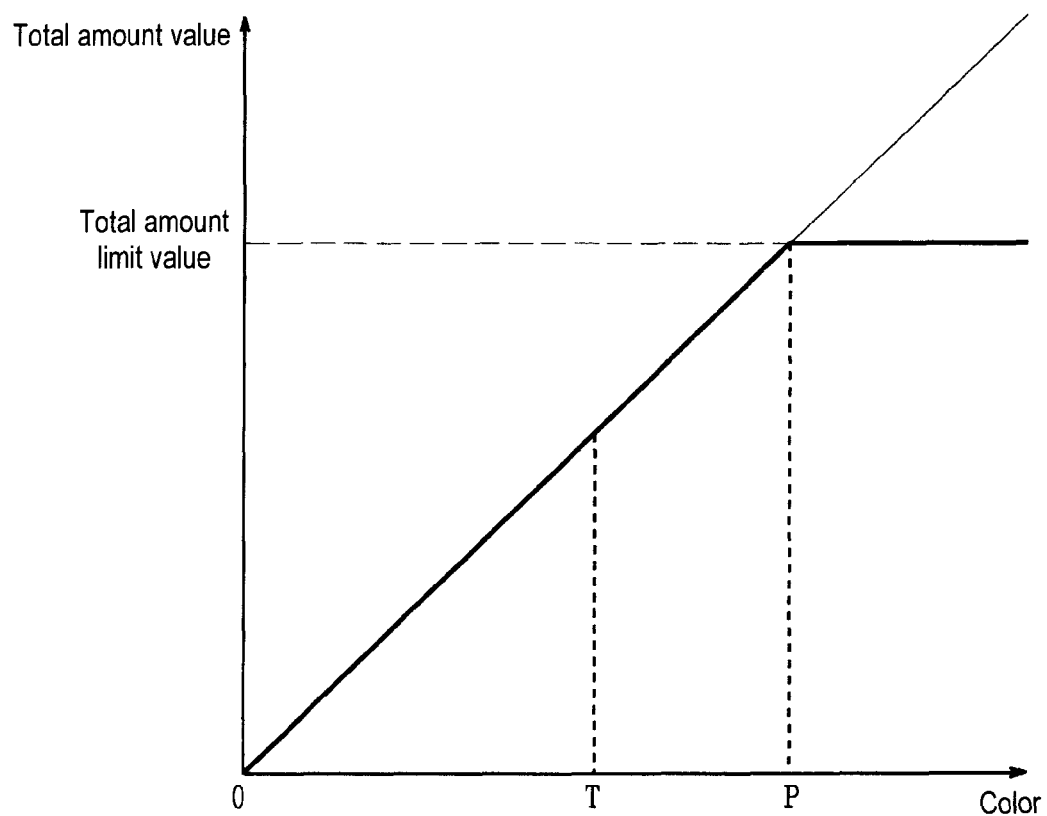
FIG. 17 is a graph showing an example of a variation of the total amount caused by the total amount limitation.

FIG. 13 shows an example of a computer program, a storage medium storing the computer program, and a computer in the case that the functions described by any of the exemplary embodiments of the invention are implemented as the computer program. In FIG. 13, reference numeral 61 denotes a program; 62, a computer; 71, a magneto-optical disc; 72, an optical disc; 73, a magnetic disk; 74, a memory; 81, a CPU; 82, an internal memory; 83, a reading section; 84, a hard disk drive; 85, an interface; and 86, a communication section.

All or part of the functions of the individual sections described in each of the above-described embodiments of the invention may be implemented as the program 61 that can be run by the computer 62. In this case, the program 61 and data to be used by the program 61 may be stored in advance in a storage medium that can be read by the computer 62. The term "storage medium" means a medium which causes magnetic, optical, electrical, or like energy variation states in the reading section 83 as part of the hardware resources of the computer 62 according to the contents of the program 61 and transmits the contents of the program 61 to the reading section 83 in the form of a corresponding signal. The magneto-optical disc 71, the optical disc 72 (CD, DVD, or the like), the magnetic disk 73, and the memory 74 (IC card, memory card, or the like) are examples of the storage medium. Naturally, the storage medium is not limited to portable ones.

All or part of the functions described in each of the above embodiments of the invention are performed by storing the program 61 in the storage medium in advance, reading the program 61 by the computer 62 by inserting the storage medium in, for example, the reading section 83 or the interface 85 of the computer 62, storing it in the internal memory 82 or the hard disk drive 84, and running it by the CPU 81. Alternatively, all or part of the functions described in each of the above embodiments of the invention may be performed by transferring the program 61 to the computer 62 over a network or the like. In the computer 62, the program 61 is received by the communication section 86, stored in the internal memory 82 or the hard disk drive 84, and run by the CPU 81.

Various devices may be connected to the computer 62 via the interface 85. For example, a display device for displaying information, an input device through which a user inputs information, and other devices may be connected so as to be used when the user sets a total amount limit value, a color conversion table, or an output device characteristic. An output device may be connected so as to make output according to output color signals or second color signals. Furthermore, an image input device may be connected so that color processing is performed on an image that is input through the image input device and a resulting image is output through an output device.

What is claimed is:

1. A color signal processing apparatus comprising:
    a total amount calculating unit that calculates a total amount value of an input color signal in an output device color space which has, as color components, coloring materials used in an output device;
    a limit value calculating unit that calculates a limit value for limiting the total amount of the input color signal, in accordance with the calculated total amount value;
    a correcting unit that corrects the input color signal in the output device color space so that the total amount value of the input color signal becomes the calculated limit value or less, wherein the input color signal is one of second color signals in a color conversion table in which first color signals in an input color space are correlated in advance with the second color signals in the output device color space; and
    a color conversion table correcting unit that corrects the color conversion table by replacing the one of the second color signals in the color conversion table with the corrected input color signal for subsequent conversion of input color signals using the corrected color conversion table,
    wherein when the output device color space is a device-independent color space,
    the color components of the output device color space include black, and
    if the total amount value of the input color signal exceeds the limit value calculated by the limit value calculating unit, the correcting unit corrects the input color signal by decreasing the respective color components of the input color signal at an equal rate so that the total amount value of the input color signals becomes less than the calculated limit value.

2. The color signal processing apparatus according to claim 1, wherein the input color signal is a color signal on a contour of a color gamut of the output device color space,
    the color signal processing apparatus further comprising:
    a color gamut information generating unit that generates color gamut information based on the input color signal corrected by the correcting unit.

3. The color signal processing apparatus according to claim 2, further comprising:
    a color converting unit that converts an arbitrary color signal into a color signal in a color gamut indicated by the color gamut information generated by the color gamut information generating unit, using the color gamut information.

4. A non-transitory computer-readable medium storing a program that causes a computer to execute color signal processing, the color signal processing comprising:
    calculating a total amount value of an input color signal in an output device color space which has, as color components, coloring materials used in an output device;
    calculating a limit value for limiting the total amount of the input color signal, in accordance with the calculated total amount value;
    correcting the input color signal in the output device color space so that the total amount value of the input color signal becomes the calculated limit value or less, wherein the input color signal is one of second color signals in a color conversion table in which first color signals in an input color space are correlated in advance with the second color signals in the output device color space; and correcting the color conversion table by replacing the one of the second color signals in the color conversion table with the corrected input color signal for subsequent conversion of input color signals using the corrected color conversion table, wherein when the output device color space is a device-independent color space, the color components of the output device color space include black, and if the total amount value of the input color signal exceeds the limit value calculated by the limit value calculating unit, the correcting unit corrects the input color signal by decreasing the respective color components of the input color signal at an equal rate so that the total amount value of the input color signals becomes less than the calculated limit value.

5. A color signal processing method comprising:

calculating a total amount value of an input color signal in an output device color space which has, as color components, coloring materials used in an output device;

calculating a limit value for limiting the total amount of the input color signal, in accordance with the calculated total amount value;

correcting the input color signal in the output device color space so that the total amount value of the input color signal becomes the calculated limit value or less, wherein the input color signal is one of second color signals in a color conversion table in which first color signals in an input color space are correlated in advance with the second color signals in the output device color space; and correcting the color conversion table by replacing the one of the second color signals in the color conversion table with the corrected input color signal for subsequent conversion of input color signals using the corrected color conversion table, wherein when the output device color space is a device-independent color space, the color components of the output device color space include black, and if the total amount value of the input color signal exceeds the limit value calculated by the limit value calculating unit, the correcting unit corrects the input color signal by decreasing the respective color components of the input color signal at an equal rate so that the total amount value of the input color signals becomes less than the calculated limit value.

6. The color signal processing apparatus according to claim 1, further comprising:

a color gamut information generating unit generates color gamut information based on the input color signal corrected by the correcting unit and an output device characteristic acquired by an output device characteristic acquiring unit.

7. The non-transitory computer-readable medium according to claim 4, further comprising:

generating color gamut information based on the input color signal corrected and an output device characteristic.

8. The color signal processing method according to claim 5, further comprising:

generating color gamut information based on the input color signal corrected and an output device characteristic.

* * * * *